March 10, 1936. W. H. A. GUBITZ 2,033,520
MOTOR VEHICLE
Filed Nov. 8, 1933
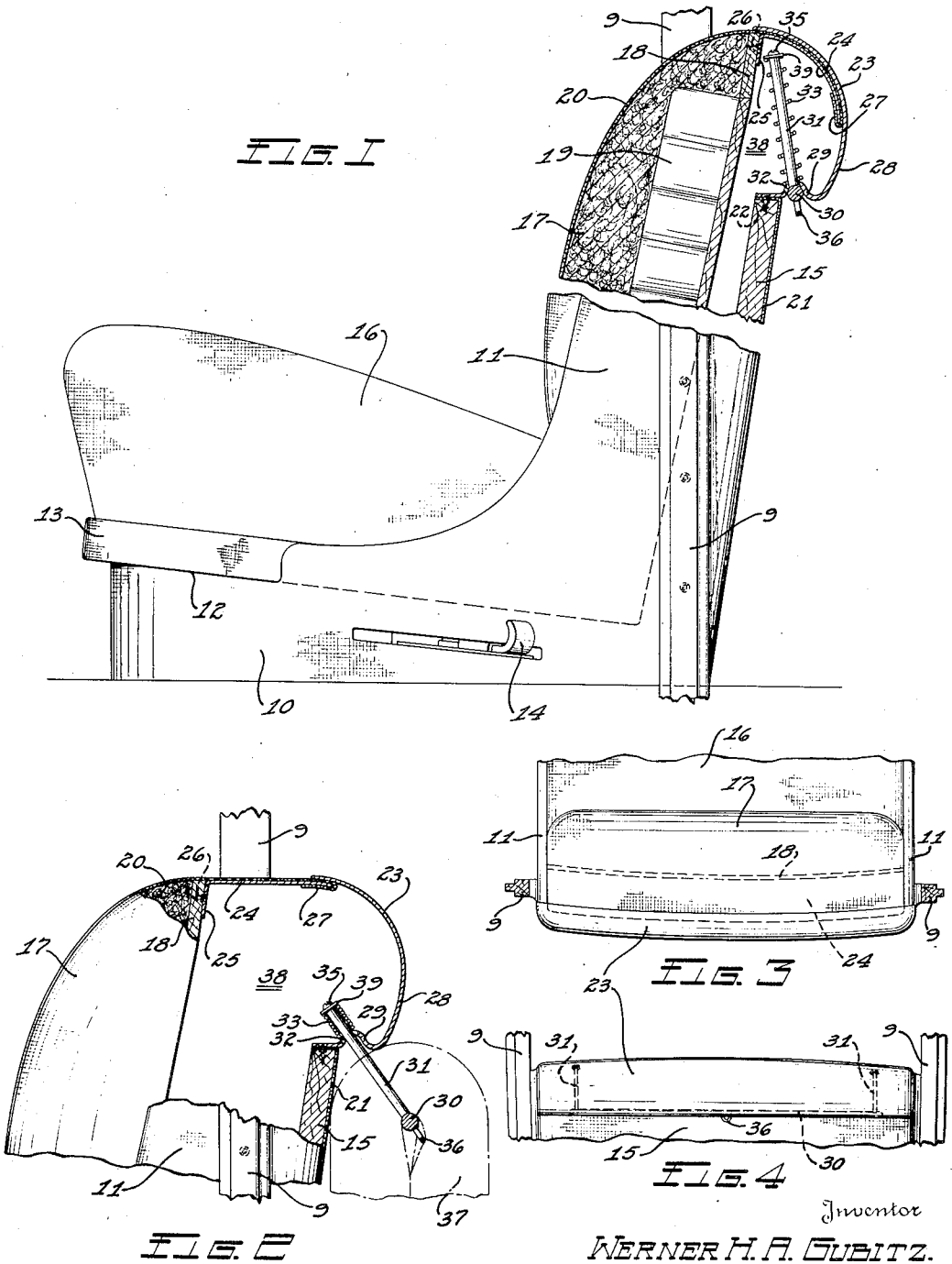
Inventor
WERNER H. A. GUBITZ.

Patented Mar. 10, 1936

2,033,520

UNITED STATES PATENT OFFICE 2,033,520

MOTOR VEHICLE

Werner H. A. Gubitz, Detroit, Mich., assignor to Packard Motor Car Company, Detroit, Mich., a corporation of Michigan Application November 8, 1933, Serial No. 697,104

10 Claims. (Cl. 155—14)

This invention relates to seats and more particularly to adjustable seats for motor vehicles.

In order that drivers of different stature can comfortably operate the control pedals and the steering wheel of a motor vehicle, it is customary to provide a seat which can be bodily adjusted or which has a seat portion which can be adjusted on a stationary standard. When the seat standard provides a rigid transverse brace for a vehicle body, it is more desirable to have the seat adjustable relative to the standard.

In structures having the seat adjustable relative to the standard, provision can be made whereby the standard side walls are such that they enclose the sides of the seat in any extended position and some extensible means has to be provided for covering the space between the top of the seat and the top of the supporting standard. As one means of covering such space, it has been proposed to fasten one end of a sheet of fabric to the top of the adjustable seat and pass it over a supporting means at the top of the standard, the other end being held in a stretched relation by resilient means anchored between the standard and the seat. This manner of covering such space is objectionable because the cloth is apt to become displaced so that it presents a wrinkled appearance and also because of the cost of the supporting and holding means for the fabric and the time required for installing the same.

An object of this invention is to provide enclosure means, for the space formed between the top of a supporting standard and an adjustable seat, which will present an unwrinkled exterior surface when exposed.

Another object of my invention is to provide a seat structure in which a cover member for bridging the space between the top of an adjustable seat and its stationary standard can be produced at a low cost and readily installed.

A further object of the invention is to provide a seat structure with which a rack is associated in a concealed relation.

Other objects of the invention will appear from the following description taken in connection with the drawing, which forms a part of this specification, and in which:

Fig. 1 is a side elevation of a seat structure, partly in section, illustrating my invention;

Fig. 2 is a fragmentary portion of the structure shown in Fig. 1 with the seat in extended position relative to the supporting standard;

Fig. 3 is a plan view of the seat structure in the extended position as shown in Fig. 2;

Fig. 4 is a fragmentary elevational view of the rear side of the seat structure, illustrating the relation of the concealed rail therewith;

Referring now to the drawing by characters of reference, 10 represents the base portion of a seat supporting standard which is adapted to rest upon the floor of a motor vehicle so that the upstanding sides 11 thereof can be fixed rigidly to the pillars 9. The base portion of this standard is formed with a surface 12 on which the bottom frame 13 of a seat is mounted to slide longitudinally of the motor vehicle so as to place the occupant or driver closer to or further away from the control pedal and steering wheel. A suitable latch means, as indicated at 14, is assocated with the standard and the seat base frame 13 in order to retain the seat in its various positions of desired adjustment, a suitable latch mechanism for this purpose being illustrated in Patent 1,877,769 issued September 20, 1932, to Archer L. Knapp.

The sides 11 and the back 15 of the seat standard are formed to provide a shell in which the rear of the seat cushion 16 and the back cushion 17 slide, the sides being of sufficient depth to enclose the rear portion of the seat cushion 16 and the back cushion 17 when the seat is extended to its most forward position, as shown in Fig. 2. The seat includes, beside the base 13 and the cushions 16 and 17, a back frame 18 and a spring structure 19, the back cushion 17 being enclosed by a cover formed of suitable material, as indicated at 20. The exterior of the supporting standard is also covered by a suitable material, as indicated at 21.

Fixed along the upper edge of the back of the standard by screws, as indicated at 22, is a finishing molding 23 formed preferably of sheet metal which is curved to snugly receive the top of the seat when in its rearmost position. It is obvious that the front end of this molding covers only the rearmost portion of the top of the cushion when the seat is in position furthest away from the control pedals and the steering gear so that forward adjustment of the seat will leave a space between the molding and the back of the seat.

In order to cover this space, I provide an extension or filler member 24 which extends rearwardly from the back portion of the seat and is provided with a downturned flange end 25 which is fixed to the back of the seat frame by screws, as indicated at 26. The fabric 20 preferably extends rearwardly beyond the seat back a sufficient length to cover this filler member and the end 27 is doubled back over the free end of the filler and suitably secured thereto, as by cement. The filler member is of a flexible nature, preferably in the form of sheet metal, so that it will form a solid wall across the space between the seat back and the molding, when bridging a space therebetween, and will exert pressure in a direction tending to hold it frictionally against the inner surface of the molding.

This filler member will thus readily assume the form of the molding and will provide a fabric covered wall across any space between the back of the seat and the molding caused by adjustment of the seat. This filler member can be quickly applied to or removed from the seat, it can be manufactured and assembled for a very small cost and it will serve to maintain the overlying fabric in an unwrinkled condition at all times.

The molding is provided with a relatively large overhanging portion 28 having a lower portion bent inwardly transversely, as indicated at 29, forming a recess to receive a rail 30, the rail engaging in said recess when in inoperative position. The rail when engaged in the recess, lies substantially within the general outline of the molding and is concealed by the overhanging portion of the molding so that it will not be observed by an occupant of the vehicle.

The rail 30 is movable from its inoperative position outwardly away from the frame back into the operative position shown in Fig. 2. The mechanism for supporting the rod for movement between its inoperative and operative positions comprises a pair of rods 31 secured to the ends of the rail and projecting through openings, as indicated at 32, in the molding. A coil spring 33 encircles each of the rods and bears at one end against the molding and at the other end against a retainer 39 fixed to the inner end of the rod by screws, as indicated at 35. These springs will normally maintain the rods and the rail in the position shown in Fig. 1 so that the only exposed portion of the rail is a grip member 36. In Fig. 2, I have illustrated the rail and the rods in extended position with a robe, as indicated at 37, supported by the rail. The space between the molding and the back of the seat provides an enclosed chamber 38 which is large enough to conveniently house the rail rods and their springs in any adjusted position. By concealing the rail in the manner described, more space is provided at the rear of the seat structure than when the rail is permanently attached to the back thereof.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a seat structure, the combination with a frame back and a seat back slidable toward and away from the frame back, of a relatively stiff filler member secured to the top of the seat back and slidably engaging the under face of the top of the frame back, said filler member being sufficiently flexible to bend under engagement with the frame member.

2. In a seat structure, the combination with a frame back having the upper end curving forwardly and a seat back slidable toward and away from the frame back, of a relatively stiff member extending across and secured to the top of the seat back, said member telescoping into and frictionally engaging the inner surface of the curved upper end of the frame back and having sufficient flexibility to bend under said engagement.

3. In a seat structure, the combination with a frame back having the upper end curved forwardly and a seat back slidable toward and away from the frame back, of a fabric covered sheet metal filler secured to and projecting rearwardly from the top of the seat back and slidable beneath the upper end of the frame back.

4. In a seat structure, the combination with a supporting frame back having the upper end curved forwardly and a seat adjustable toward and from the frame back and having a back and a fabric covered back cushion, of a rearwardly extending relatively stiff member secured to the top portion of the seat back and extending rearwardly a sufficient distance to engage the under curved surface of the supporting frame back in any position of adjustment and having sufficient flexibility to conform to said surface, the fabric on said cushion being extended to cover the exterior surface of the member.

5. In a seat structure, the combination with a stationary curved molding open at the forward end, and a seat back movable toward and away from the molding, of a cover member attached to the rear top surface of the seat back and extending into the open end of and in frictional engagement with the inner surface of the molding.

6. In a seat structure, the combination of an overhanging seat frame molding having a recessed under wall, a rail seated in the recess in said wall when in inoperative position and movable outwardly therefrom into operative position, means for supporting the rail for movement between recess engaging and operative positions, and means cooperating with the molding and rail normally maintaining the rail in the recess.

7. In a seat structure, the combination of an overhanging molding having a recess in its under surface, a rail adapted to seat in said recess, arms on the rail projecting through the molding wall, and means cooperating with said molding wall and said arms normally maintaining said rail seated in the recess.

8. In a seat structure, the combination with a frame back and a seat back slidable toward and away from the frame back, of a relatively stiff but flexible member secured to the seat back and slidably engaging the top of the frame back for filling in the space between the top of the frame back and the seat back.

9. A frame back having a top wall of relatively stiff sheet material, a seat back slidable toward and from the frame back, and a top wall of sheet material secured to the top of the seat back, extending rearwardly therefrom and telescoping with the top wall of the frame back for filling in the space between the top of the seat back and the top of the frame back.

10. In a seat structure, the combination with a frame back having a top wall of relatively stiff sheet material forwardly curved in cross section, a seat back slidable toward and from the frame back, and a top wall of sheet material secured to the top of the seat back and extending rearwardly therefrom and telescoping with the top wall of the frame back for filling in the space between the top of the seat back and the top of the frame back, the second wall being constructed to be flexed by engagement with the curved surface of the first wall.

WERNER H. A. GUBITZ.